United States Patent
Azuma et al.

(10) Patent No.: US 7,985,022 B2
(45) Date of Patent: *Jul. 26, 2011

(54) REMOTE TEMPERATURE SENSING DEVICE AND RELATED REMOTE TEMPERATURE SENSING METHOD

(75) Inventors: Daichi Azuma, Myrtle Beach, SC (US); Ryusuke Hasegawa, Morristown, NJ (US)

(73) Assignee: Metglas, Inc., Conway, SC (US)

( * ) Notice: Subject to any disclaimer, the term of this patent is extended or adjusted under 35 U.S.C. 154(b) by 648 days.

This patent is subject to a terminal disclaimer.

(21) Appl. No.: 11/712,449

(22) Filed: Mar. 1, 2007

(65) Prior Publication Data

US 2008/0212646 A1 Sep. 4, 2008

(51) Int. Cl.
*G01K 7/00* (2006.01)
(52) U.S. Cl. ........................ 374/176; 374/177
(58) Field of Classification Search .................. 374/176, 374/177
See application file for complete search history.

(56) References Cited

U.S. PATENT DOCUMENTS

| | | | |
|---|---|---|---|
| 4,052,696 A | 10/1977 | Enabnit | |
| 4,142,571 A | 3/1979 | Narasimhan | |
| 4,434,411 A | 2/1984 | Anderson, III et al. | |
| 4,533,259 A * | 8/1985 | Wakahara | 374/166 |
| 4,537,517 A | 8/1985 | Inomata et al. | |
| 6,028,253 A | 2/2000 | Eby | |
| 6,208,253 B1 | 3/2001 | Fletcher et al. | |
| 6,991,045 B2 * | 1/2006 | Vinegar et al. | 175/45 |
| 2005/0229690 A1 * | 10/2005 | Kikuchi et al. | 73/146 |
| 2007/0263699 A1 | 11/2007 | Clothier et al. | |
| 2008/0212646 A1 | 9/2008 | Azuma et al. | |

FOREIGN PATENT DOCUMENTS

| | | |
|---|---|---|
| JP | 55052921 | 4/1980 |
| JP | 58095232 | 6/1983 |

OTHER PUBLICATIONS

International Search Report, mailed Aug. 7, 2008 and issued in corresponding International Patent Application No. PCT/US2008/005019.
Final Office Action in related co-pending U.S. Appl. No. 11/712,444 mailed Mar. 1, 2010.
Office Action mailed Aug. 17, 2010 for co-pending U.S. Appl. No. 11/712,444.
Soshin Chikazumi, "Physics of Magnetism", Published by John Wiley & Sons, NY (1964), p. 498 (in English) and title page and chapter page.
International Search Report and Written Opinion of the International Searching Authority, mailed on Aug. 1, 2008 and issued in corresponding International Patent Application No. PCT/US2008/005018.
Soshin Chikazumi, "Physics of Magnetism", Published by John Wiley & Sons, NY (1964), p. 498 (in English) and title page and chapter page. U.S. Appl. No. 11/712444, filed Mar. 1, 2007, Temperature Sensor and Related Remote Temperature Sensing Method by Ryusuke Hasegawa and Daichi Azuma, Metglas, Ltd. 440 Allied Drive Conway, SC 29526 USA.
Second PCT Written Opinion dated Dec. 23, 2010 for PCT/US08/05019, which is based on this application.
Second PCT Written Opinion dated Dec. 23, 2010 for PCT/US08/05018, which is based on co-pending U.S. Appl. No. 11/712,444.
Notice of Allowance dated Dec. 16, 2010 of co-pending U.S. Appl. No. 11/712,444.

* cited by examiner

*Primary Examiner* — Lisa M Caputo
*Assistant Examiner* — Mirellys Jagan

(57) ABSTRACT

A device and method of remote temperature sensing, the device having a temperature sensor placeable on a rotating item utilizing the temperature sensor being a plurality of rectangular shaped amorphous magnetic alloy strips connected magnetically, wherein at least one of the strips has a predetermined ferromagnetic Curie temperature and another strip has a magnetic permeability exceeding 2,000.

22 Claims, 12 Drawing Sheets

1200

REMOTE TEMPERATURE SENSING DEVICE AND RELATED REMOTE TEMPERATURE SENSING METHOD

BACKGROUND OF THE INVENTION

1. Field of the Invention

The invention relates to a remote temperature sensing device and a method of remote temperature sensing for a rotating item, in which a Curie magnetic transition of an amorphous ferromagnetic material is utilized. More particularly, the present invention provides a device and a method of remote temperature sensing of a rotating component of a moving machine.

2. Description of the Related Art

There are a number of techniques and tools available to measure temperature, including a well-known temperature indicator such as a classical mercury thermometer, a thermocouple, a resistance thermometer, a bi-metal, and the like. All of these utilize some basic physical phenomena which vary with temperature, thus each having a unique feature. For example, mercury thermometry is effective for visual sensing of temperature, but is not suited for direct conversion of a temperature to an electrical signal. A thermocouple which utilizes thermoelectric effects of metals is more suited if an electronic reading of a temperature is needed. However, a thermocouple has to be wired to a voltmeter, which converts an electrical signal to a corresponding temperature. A resistance thermometer, which utilizes the temperature dependence of resistivity of a metal, also has to be wired to a voltmeter. These techniques requiring wire connections between a sensor and a temperature indicator, therefore, are not suited for remote sensing of a temperature. In such cases, as in sensing the temperature of a moving tire, remote sensing of the temperature becomes necessary, and a temperature sensor utilizing the temperature dependence of resistivity of a semiconductor is used. However, this type of sensor requires a power source to transmit a signal. The sensor is installed on a rotating rim or tire. Accordingly, it is difficult to apply the power from the automobile body to rotating tires, and also it is necessary to utilize a battery in order that the temperature monitoring device can correctly function. This kind of a sensor must respond to the temperature and send a temperature-dependent signal wirelessly to a detector for further signal processing. This type of temperature sensing is increasingly needed for automotive tires to prevent the pneumatic tires from bursting due mainly to the temperature rise of the tires during operation.

One such sensor may be realized by utilizing the Curie magnetic transition in a ferromagnetic material such as iron, which has a ferromagnetic Curie temperature above which ferromagnetism disappears along with all related phenomena such as high magnetization and permeability. The change of the magnetization and the permeability of a ferromagnetic material at the Curie temperature may be readily detected remotely by conventional magnetometry. U.S. Pat. No. 4,052,696 discloses a tire temperature sensing circuit that utilizes the Curie magnetic transition in a ferrite element. The magnetic change at the Curie transition is detected by an inductive coupling effect. Thus, this technique requires a very small gap between the ferrite-based temperature sensor and a stationary detector to maintain a reliable detecting signal. The distance of this gap is thus very small because ferrites usually have relatively low magnetic permeabilities ranging from 80 to 2000, as is noted, for example, on page 498 of "Physics of Magnetism" by S. Chikazumi (John Wiley & Sons, NY, 1964). Thus, there is a need for temperature sensors which do not require batteries and are capable of remote detection within a practical detection range. Also needed is a temperature sensing device with as little electrical circuitry as possible.

SUMMARY OF THE INVENTION

The present invention provides a temperature sensor adapted to sense an occurrence of a temperature change in a rotating item, such as an automotive tire, and a method of remote temperature sensing for same.

The present invention eliminates a need to house a battery with the sensor. Generally stated, the sensor includes a plurality of amorphous magnetic metal strips which are magnetically connected. Furthermore, the strips are arranged in such a manner that at least one of the strips has a predetermined ferromagnetic Curie temperature which is intended to be detected and another strip or strips have a high magnetic permeability. Chemical compositions of the amorphous alloy strips suited for a temperature sensor of the present invention are provided.

The remote temperature sensing device and method of the present invention minimizes the use of electrical circuitry.

In one embodiment, a remote temperature sensing device having a temperature sensor placeable on a rotating item includes the temperature sensor being a plurality of rectangular shaped amorphous magnetic alloy strips connected magnetically, wherein at least one of the strips has a predetermined ferromagnetic Curie temperature and another strip has a magnetic permeability exceeding 2,000.

In an embodiment, the amorphous magnetic alloy strip with the predetermined ferromagnetic Curie temperature has a composition defined essentially by the formula: $Fe_aM_bB_cSi_dC_e$, wherein $61<a<81$, $0<b<15$, $2\leq c<25$, $0<d<10$ and $0<e\leq 18$ and $a+b+c+d+e=100$, numbers being in atom percent, with the proviso that up to 50% of Fe content may be replaced by Ni, and M being selected from Cr, Mo, Nb, Ti, and W.

Where desired, the another amorphous magnetic alloy strip has a magnetic permeability exceeding 2,000 and has a composition defined essentially by the formula: $Fe_aNi_bCo_cM_eB_fSi_gC_h$, wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+h=100$, numbers being in atom percent.

In one embodiment, the sensing device includes: one amorphous magnetic alloy strip with the predetermined ferromagnetic Curie temperature and has a composition defined essentially by the formula: $Fe_a\ M_b\ B_c\ Si_d\ C_e$, wherein $61<a<81$, $0<b<15$, $2\leq c<25$, $<d<10$ and $0<e\leq 18$ and $a+b+c+d+e=100$, numbers being in atom percent, with the proviso that up to 50% of Fe content may be replaced by Ni, and M being selected from Cr, Mo, Nb, Ti, and W; and the another amorphous magnetic alloy strip has a magnetic permeability exceeding 2,000 and has a composition defined essentially by the formula: $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

In an embodiment, the another strip of the sensing device includes: two amorphous magnetic alloy strips having a magnetic permeability exceeding 2,000, and the two amorphous magnetic alloy strips having two different compositions defined essentially by the formula: $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+h=100$, numbers being in atom percent.

In another embodiment, the sensing device includes: one amorphous magnetic alloy strip with the predetermined ferromagnetic Curie temperature and has a composition defined essentially by the formula: $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, with the proviso that up to 50% of Fe content may be replaced by Ni, and M being selected from Cr, Mo, Nb, Ti, and W; and the another strip has a magnetic permeability exceeding 2,000 and includes two amorphous magnetic alloy strips with a same chemical composition defined essentially by the formula: $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+h=100$, numbers being in atom percent.

In another embodiment, the sensing device includes: an at least one amorphous magnetic alloy strip having a magnetic permeability exceeding 2,000 and having a composition defined essentially by the formula: $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+h=100$, numbers being in atom percent; and a plurality of amorphous magnetic alloy strips with different chemical compositions defined essentially by the formula: $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, with the proviso that up to 50% of Fe content may be replaced by Ni, and M being selected from Cr, Mo, Nb, Ti, and W and defined essentially by the formula: $Fe_aNi_bCo_cM_eB_{fSig}C_h$ wherein $3<a<80$, $0<b<41$, $0<c<72$, $1<e<4$, with M selected from Cr, Mo, and Mn, $1<f<20$, $0<g<16$ and $0<h<4$, and $a+b+c+e+f+h=100$, numbers being in atom percent.

Where desired, the temperature sensor may be interrogated by a magnetic field, and the temperature sensor's response signal may be detected electromagnetically;

In one embodiment, the sensing device includes at least one coil emanating an interrogating magnetic field and at least one coil detecting a magnetic response of said temperature sensor.

Where desired, the rotating item may be a vehicle tire.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

The invention will be more fully understood and further aspects and advantages of the invention will become apparent and more readily appreciated when reference is made to the following detailed description of the embodiments of the invention and the accompanying drawings in which.

DETAILED DESCRIPTION OF THE PREFERRED EMBODIMENTS

Figure 1:
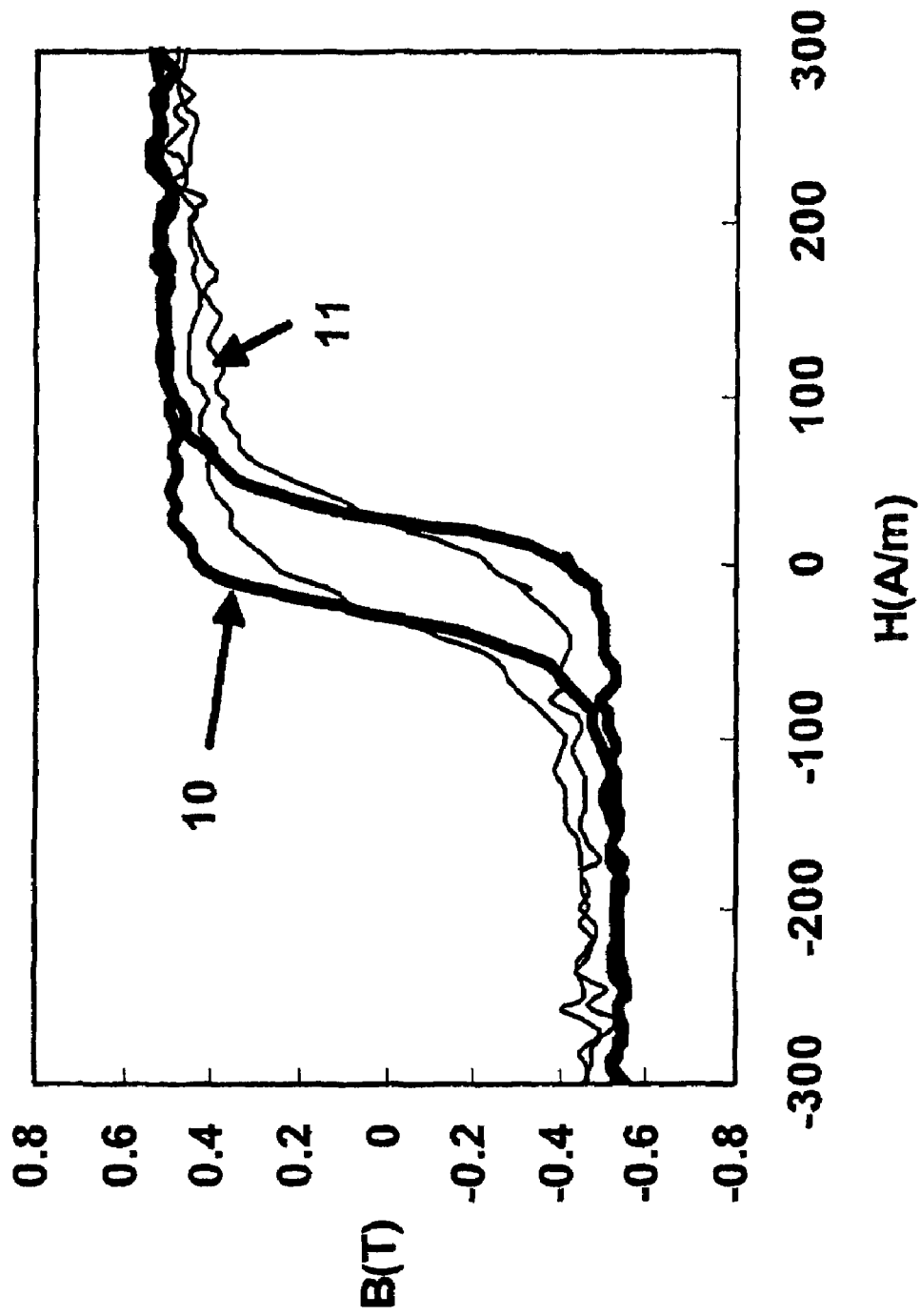
FIG. 1 is a graphical representation of magnetic induction B plotted vs. an applied magnetic field H, comparing BH behaviors of two magnetic amorphous metal strips, one with a length of 80 mm, shown by Curve 10 and the other with a length of 40 mm, shown by Curve 11, in accordance with embodiments of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Amorphous magnetic alloy strips according to embodiments of the present invention were prepared by a process outlined in Example 1 (see below). The first operation for the illustrated embodiments of the present invention was to examine basic magnetics of the amorphous alloy strips by a method described in Example 2 (see below). Referring to FIG. 1, in which magnetic induction B in tesla (T) is plotted as a function of an applied magnetic field H in A/m for amorphous magnetic strips, one with a length of 80 mm, shown by Curve 10, and the other with a length of 40 mm, shown by Curve 11. The amorphous magnetic strips according to embodiments of the present invention, whose magnetic induction is illustrated in FIG. 1, have a thickness of about 20 μm and widths of about 2 mm and are cut from a commercially available METGLAS®2714A ribbon with a saturation magnetic induction of about 0.6 T and a near-zero magnetostriction. This ribbon shows a square or rectangular BH loop when the strip's length is much longer than 75 mm. Due to the demagnetizing effect, which depends on the strip's length-to-width ratio, the BH behaviors shown in FIG. 1 for the two strips having different lengths are different, the shorter strip showing a more sheared BH loop or behavior than the longer one. This difference in the BH behaviors of the amorphous metal strips according to embodiments of the present invention results in a corresponding difference in a higher harmonics generation. The harmonic responses of the amorphous magnetic alloy strips according to embodiments of the present invention are characterized by a method described in Example 3 (see below). Generally, a magnetic thin strip with a square or rectangular BH behavior generates higher harmonics of the fundamental frequency at which the strip is magnetically excited. The amplitude and the higher harmonics spectrum of the emanating magnetic field from the magnetic strip depend on the degree of the non-linearity of the BH behavior. The degree of the non-linearity of a given magnetic strip depends on the length-to-width ratio of the strip. Examples of this relationship are given in Table I for different amorphous magnetic alloys with different ferromagnetic Curie temperatures $\theta_f$. Alloys, AM1 through AM4, in Table I are based on amorphous magnetic Fe-M-B—Si—C in which Fe content ranges from 61 to 81 atom percent of which up to 50% of Fe may be replaced by Ni, M is selected from Cr, Mo, Nb, Ti and W, and ranges from 0 to 15 atom percent, B content ranges from 2 to 25 atom percent, and Si content ranges from 0 to 10 atom percent and C content from 0 to 18 atom percent. More examples of the amorphous alloys with a similar function are given in Table III.

TABLE I

Harmonics Generation of Magnetic Amorphous Metal Strips
(Data taken by the method described in Example 3 with a
fundamental excitation frequency of 2.4 kHz)

| ALLOY | Curie Temperature, $\theta_f$ (° C.) | 25$^{th}$ Harmonic Signal (mV) | | |
|---|---|---|---|---|
| | | l = 40 mm | l = 75 mm | l = 110 mm |
| AM1 ($Fe_{62}Cr_{14}B_{18}Si_5$) | 93 | 17 | 140 | 355 |
| AM2 ($Fe_{66.5}Cr_{13}B_{18}Si_{2.5}$) | 99 | 23 | 258 | 359 |
| AM3 ($Fe_{67}Mo_7B_{20}Si_6$) | 222 | 11 | 49 | 173 |
| AM4 ($Fe_{71}Mo_6B_{20}Si_3$) | 213 | 17 | 143 | 343 |
| METGLAS ® 2705M | 350 | 35 | 323 | 1230 |
| METGLAS ® 2714A | 230 | 28 | 520 | 1590 |

As Table I indicates, the harmonic signals are not linearly proportional to the strip length, l. This is mainly due to the demagnetizing effect mentioned above, and the magnetic volume difference is secondary in the order of contributing factors to the harmonic signal generation. To demonstrate this point, two 40 mm-long amorphous metal magnetic strips of METGLAS ®2714A which generated about 22 mV of the 25$^{th}$ harmonic signal each as given in Table I were placed in parallel to keep the magnetic volume close to or slightly larger than that of a 75 mm long strip, and harmonic signals were measured. The 25$^{th}$ harmonic signal from the two 40 mm long strips was 31 mV, which was about the same level as the 28 mV obtained for a single 40 mm long strip, and was much smaller than the 520 mV from a single 75 mm-long strip, showing that two shorter strips placed in parallel with the same magnetic volume as one longer strip do not generate the same level of harmonic signals. This remarkable difference was utilized in embodiments of the present invention as demonstrated below.

Figure 2:
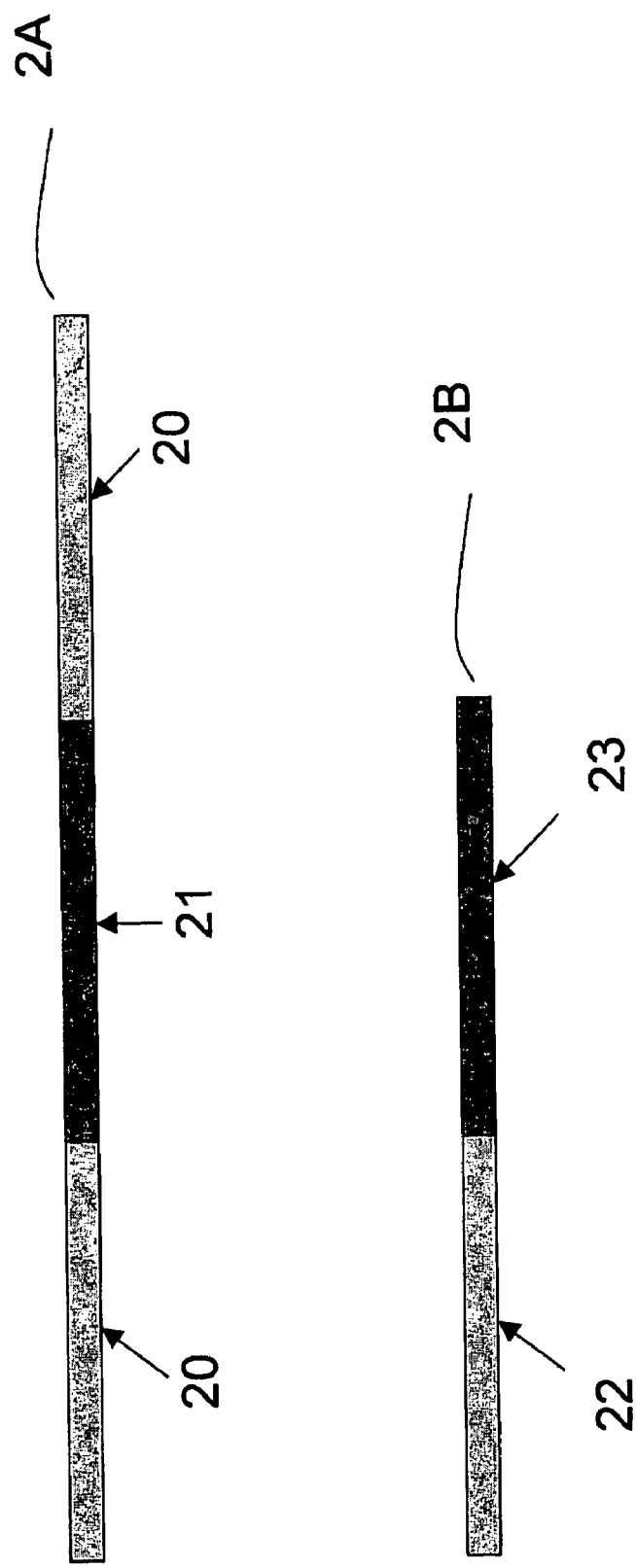
FIG. 2 is a schematic representation, showing two arrangements, 2A and 2B, for the sensor strips of embodiments of the present invention.

The two amorphous metal magnetic strips 20 of FIG. 2 with lengths of 40 mm of embodiments of the present invention prepared from METGLAS®2705M or METGLAS®2714A ribbon of Table I were connected with another amorphous metal magnetic strip 21 having a lower Curie temperature, such as AM1 through AM4 listed in Table I, than that of the 40 mm-long strips, as shown in FIG. 2. Higher harmonic signals generated from this temperature sensor configuration and embodiment of the present invention were measured by using the method of Example 3. Table II summarizes the 25$^{th}$ harmonic signals generated from each of the three-strip temperature sensors.

TABLE II

Harmonic signals at room temperature from three-strip
temperature sensors of embodiments of the present invention
with 40 mm-long center connecting strip materials 21 of FIG. 2
made from different alloys listed in Table I.

| | 25$^{th}$ Harmonic Signal (mV) | |
|---|---|---|
| ALLOY | METGLAS ® 2714A | METGLAS ® 2705M |
| AM1 | 830 | 210 |
| AM2 | 740 | 200 |
| AM3 | 480 | 170 |
| AM4 | 540 | 385 |

Figure 3:
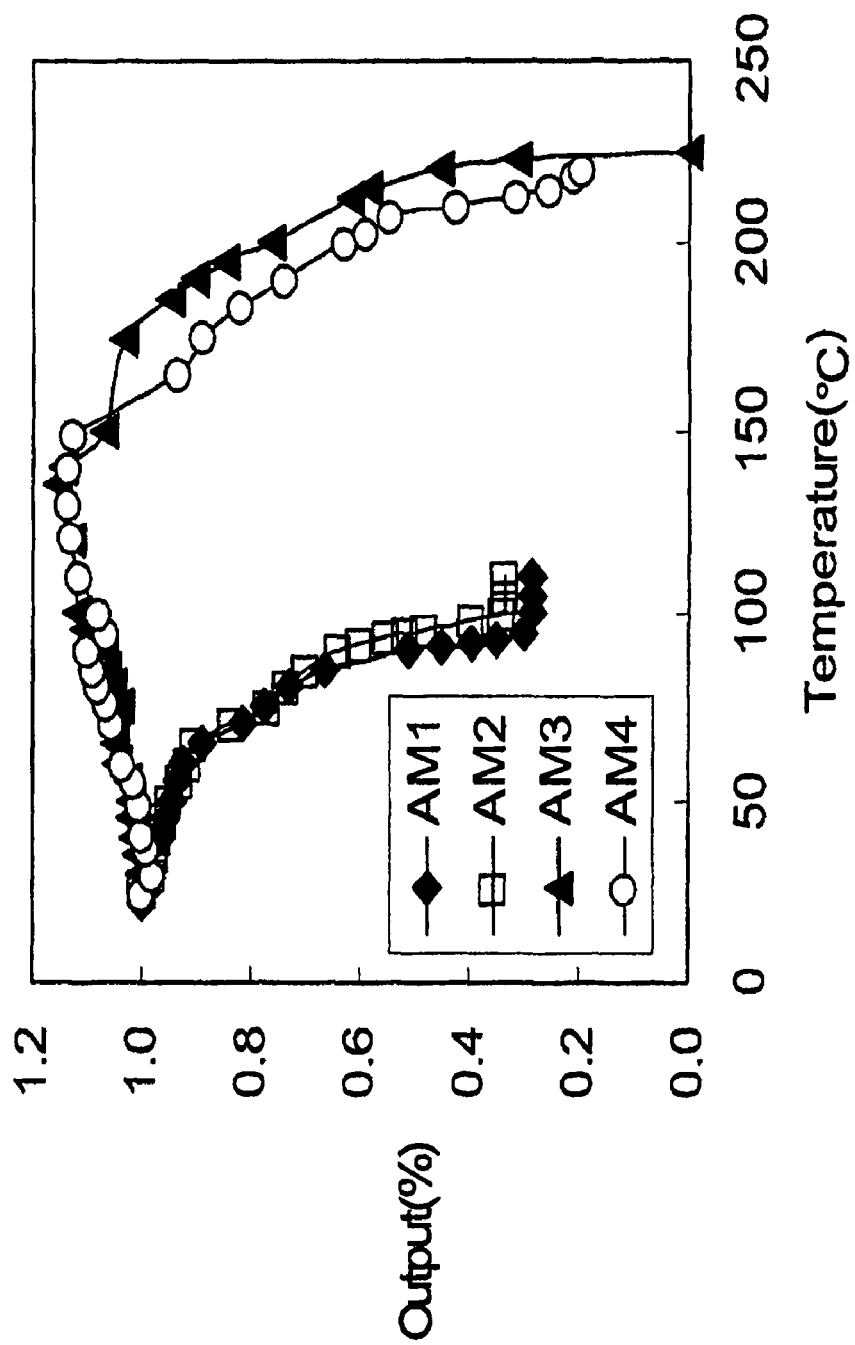
FIG. 3 is a graphical representation, depicting the temperature dependence of a three-strip sensor 2A of embodiments of the present invention of FIG. 2 in which the sensor strip elements 20 are based on METGLAS®2714A.
Figure 4:
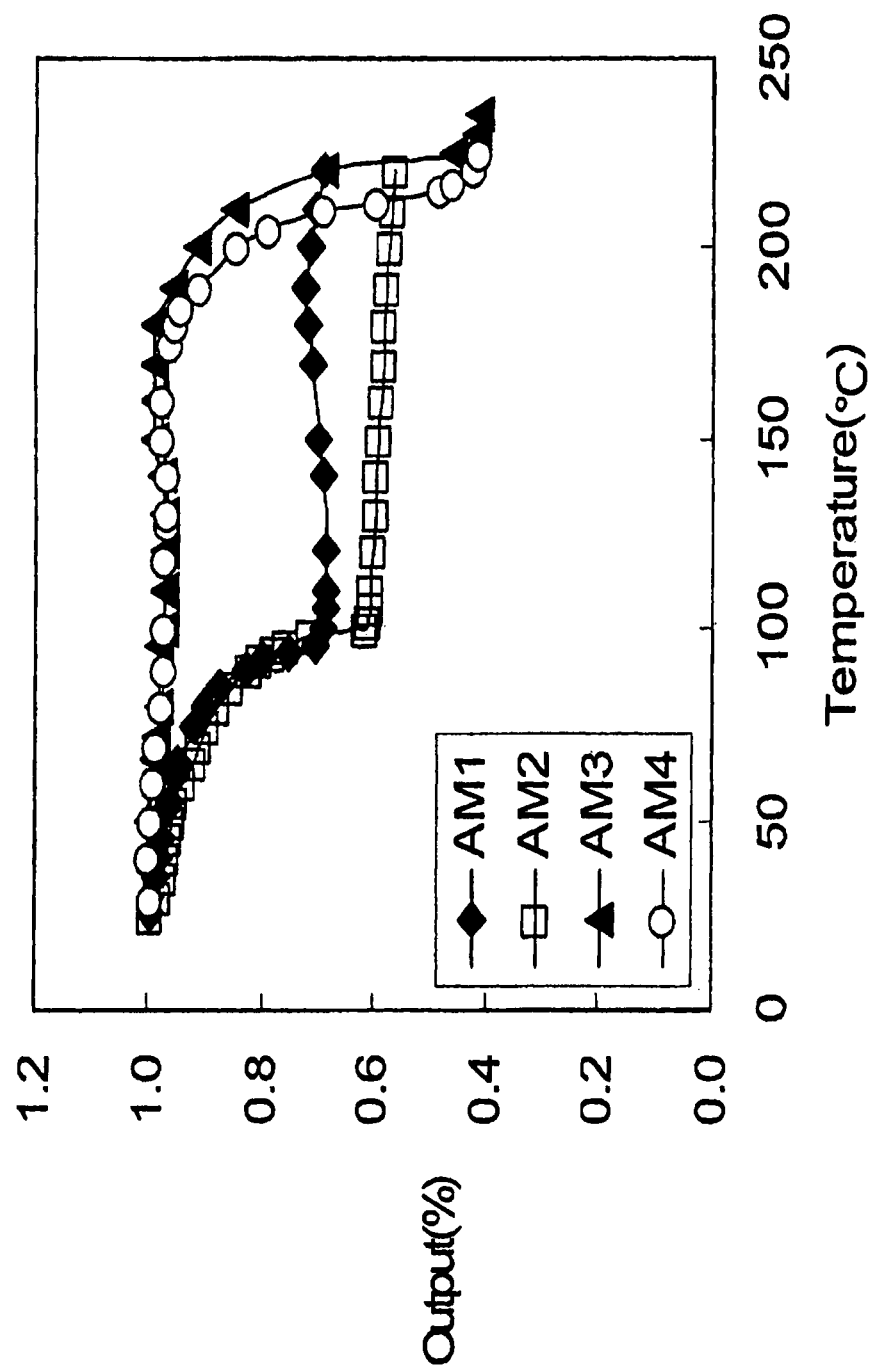
FIG. 4 is a graphical representation, depicting the temperature dependence of a three-strip sensor 2A of embodiments of the present invention of FIG. 2 in which the sensor strip elements 20 are based on METGLAS®2705M.

The temperature dependence of the harmonic signal was measured by the method described in Example 3, and the results are shown in FIG. 3, in which the two major harmonics generating strips 20 of FIG. 2 were based on METGLAS®2714A ribbon with METGLAS®2714A ribbon with $\theta_f$=230° C., and in FIG. 4, in which the harmonics generating strips 20 of FIG. 2 were based on METGLAS®2705M ribbon with $\theta_f$=350° C. The vertical scales of FIGS. 3 and 4 are in percentage changes so that direct comparison among different temperature sensors of embodiments of the present invention may be made. As depicted in FIGS. 3 and 4, temperature sensors of embodiments of the present invention show large changes in the harmonic signal generation at the Curie temperatures of the temperature sensitive amorphous metal strips chosen. Thus, the temperature of an environment in which a temperature sensor of embodiments of the present invention is placeable is determined as the same as or close to the Curie temperature of the temperature sensitive strip element, 21, in the sensor configuration 2A of FIG. 2.

Figure 5:
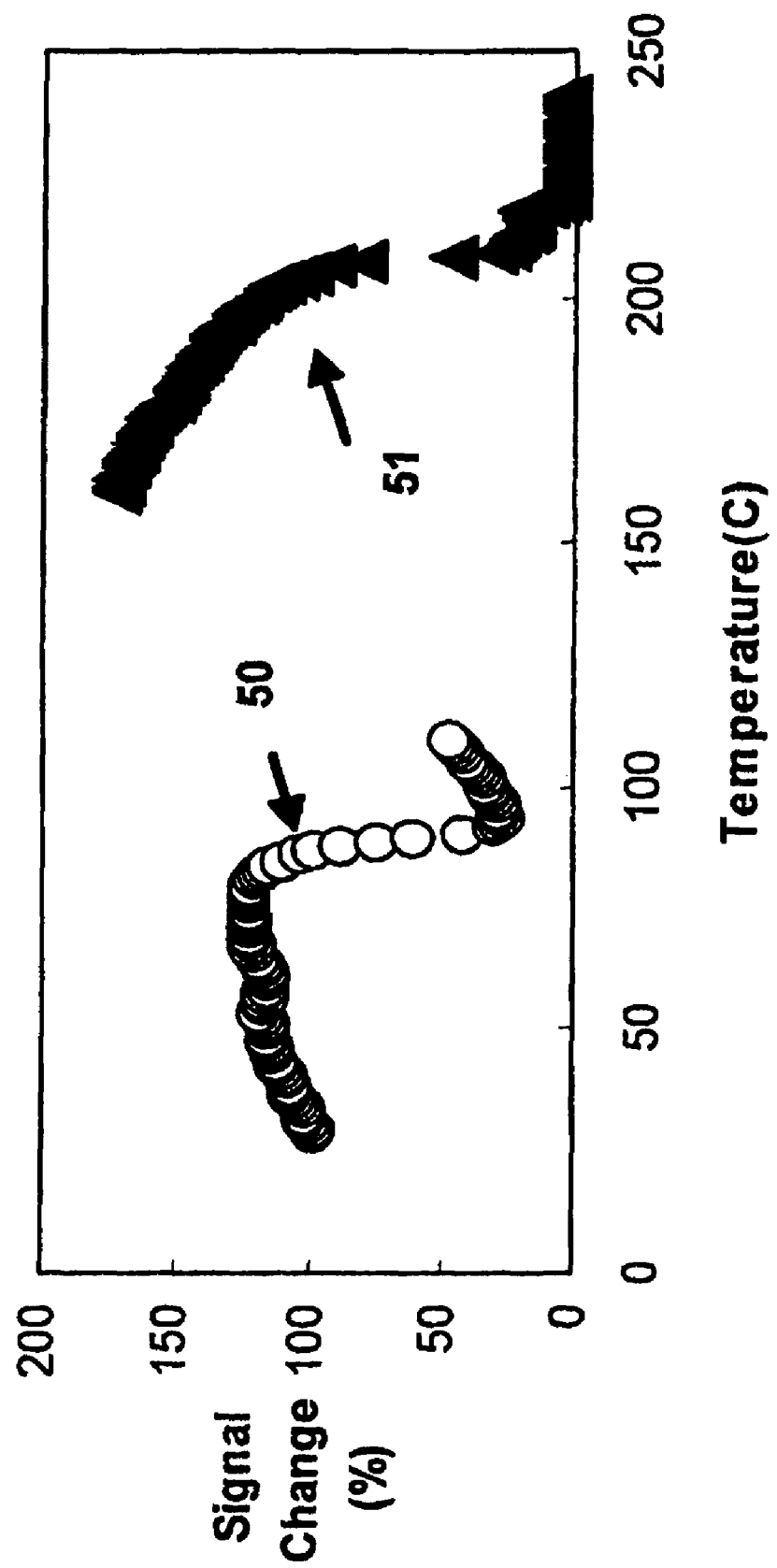
FIG. 5 is a graphical representation, depicting the temperature dependence of a two-strip sensor 2B of embodiments of the present invention of FIG. 2 in which the sensor strip element 22 is cut from METGLAS®2714A ribbon and the temperature sensing strip element 23 is cut from AM2, shown by Curve 50, and from AM3, shown by Curve 51.

Another similar example is also shown in FIG. 2, in which an amorphous magnetic metal strip 22 selected from either one of METGLAS®2714A or METGLAS®2705M ribbon listed in Table I was connected to another amorphous magnetic metal strip 23 cut from any one of AM1~AM4 alloy ribbon listed in Table I having a lower Curie temperature than that of the strip 22. Higher harmonic signals generated from this temperature sensor configuration and embodiment of the present invention were also measured by using the method of Example 3. Examples of the temperature dependence of the harmonic signals from two sensors, each with one temperature sensitive 40 mm-long strip 23, the two sensors having different Curie temperatures, and the other harmonic generating 40 mm-long strip 22 are shown in FIG. 5. The width of each strip was about 2 mm. For the two cases in FIG. 5, in the first case, the harmonic signal generating strip 22 was cut from METGLAS®2714A ribbon and the temperature sensing strip 23 was cut from AM1 alloy ribbon of Table I, which is shown by Curve 50, and in the second case, the harmonic signal generating strip 22 was cut from METGLAS®2714A ribbon and the temperature sensing strip 23 was cut from AM3 alloy ribbon of Table I, which is shown by Curve 51. It is noted that a large reduction of the harmonic signal was observed at the Curie temperature, $\theta_f=93°$ C. for AM1 and $\theta_f=222°$ C. for AM3, of the temperature sensitive strip element corresponding to the element 23 of FIG. 2 in both cases, as is clearly shown in FIG. 5. Thus the temperature of an environment in which a temperature sensor of embodiments of the present invention is placeable is determined as the same as, or close to, the Curie temperature of the particular temperature sensitive strip chosen for strip element 23 in the sensor configuration 2B of FIG. 2.

The Curie temperatures, ranging from 90° C. to 220° C., of the temperature-sensitive amorphous magnetic metal strips adopted in the temperatures sensors depicted in FIGS. 1~5 and Table I and II were chosen for the purpose of providing examples and without loss of generality. Since the Curie temperature of an amorphous magnetic alloy may be continuously changed by changing the alloy chemistry, any choice for the Curie temperature and hence, the predetermined temperature to be detected, may be utilized in a temperature sensor of embodiments of the present invention. The only requirement is that the Curie temperature of a temperature-sensitive strip element be lower than that of the main harmonic signal generating strip element. Examples of the amorphous magnetic alloys for a temperature-sensitive strip element of embodiments of the present invention are listed with their Curie temperatures in Table III. The amorphous magnetic alloys generally utilized for a temperature-sensitive strip element of embodiments of the present invention thus have a composition defined essentially by the formula: $Fe_aM_bB_cSi_dC_e$, wherein $61<a<81$, $0<b<15$, $2\leq c<25$, $0<d<10$ and $0<e\leq18$ and $a+b+c+d+e=100$, the numbers being in atom percent, with the proviso that up to 50% of Fe content may be replaced by Ni, and M being selected from Cr, Mo, Nb, Ti and W. The alloys AM1, AM2, AM3 and AM4 in Table I correspond to Alloy 21, 20,12 and 13, respectively in Table III.

TABLE III

Amorphous magnetic alloys for a temperature-sensitive strip element of embodiments of the present invention

| Alloy | Composition | Curie Temperature, $\theta_f(°$ C.) |
|---|---|---|
| 1 | $Fe_{77}Cr_2B_{17}Si_4$ | 344 |
| 2 | $Fe_{80}Cr_1B_{17}Si_2$ | 341 |
| 3 | $Fe_{76}Mo_3B_{17}Si_4$ | 318 |
| 4 | $Fe_{76}Cr_3B_{17}Si_4$ | 313 |
| 5 | $Fe_{79}Cr_2B_{17}Si_2$ | 309 |
| 6 | $Fe_{79}Mo_2B_{17}Si_2$ | 300 |
| 7 | $Fe_{78}Cr_3B_{17}Si_2$ | 283 |
| 8 | $Fe_{75}Ti_5B_{20}$ | 273 |
| 9 | $Fe_{78}Mo_3B_{17}Si_2$ | 256 |
| 10 | $Fe_{40}Ni_{34}Mo_6B_{20}$ | 241 |
| 11 | $Fe_{75}W_5B_{20}$ | 224 |
| 12 | $Fe_{67}Mo_7B_{20}Si_6$ | 222 |
| 13 | $Fe_{71}Mo_6B_{20}Si_3$ | 213 |
| 14 | $Fe_{74}Mo_6C_{18}B_2$ | 212 |
| 15 | $Fe_{75}Nb_5B_{20}$ | 209 |

TABLE III-continued

Amorphous magnetic alloys for a temperature-sensitive strip element of embodiments of the present invention

| Alloy | Composition | Curie Temperature, $\theta_f(°$ C.) |
|---|---|---|
| 16 | $Fe_{74}Mo_6B_{20}$ | 183 |
| 17 | $Fe_{72}Mo_8C_{18}B_2$ | 143 |
| 18 | $Fe_{70}Mo_{10}C_{18}B_2$ | 123 |
| 19 | $Fe_{72}Mo_8B_{20}$ | 122 |
| 20 | $Fe_{66.5}Cr_{13}B_{18}Si_{2.5}$ | 99 |
| 21 | $Fe_{62}Cr_{14}B_{18}Si_6$ | 93 |
| 22 | $Fe_{68}Mo_{12}C_{18}B_2$ | 62 |

For a harmonic signal generating strip of embodiments of the present invention, commercially available amorphous near-zero magnetostrictive alloy ribbon, such as METGLAS®2705M and METGLAS®2714A material, is suitable, as shown in Table I. In addition, any amorphous magnetic alloy ribbon with a square or rectangular BH hysteresis behavior with a low coercivity as exemplified in FIG. 1 is usable as the harmonic signal generating element of a temperature sensor of the present invention. The amorphous alloys meeting these requirements have magnetic permeabilities well above 2000, a level of permeability which is needed for effective higher harmonic generation. Examples of such amorphous alloys are listed in Table IV. For example, among all the alloys listed in Table IV, $Fe_{80}B_{10}Si_{10}$ alloy shows a lowest permeability measured by a conventional method, but it is about 7000 for 0.01 T excitation at a frequency of 1 kHz. The amorphous magnetic alloys suited for a harmonic generating strip element of embodiments of the present invention thus has a composition defined essentially by the formula: $Fe_aNi_bCo_cM_eB_fSi_gC_h$ where $3<a<80$; $0<b<41$; $0<c<72$; $0<e<4$, with M selected from Cr, Mo, and Mn; $1<f<20$; $0<g<16$; and $0<h<4$; $a+b+c+e+f+g+h=100$. Another requirement for a harmonic signal generating strip element of embodiments of the present invention is that the Curie temperature of the harmonic signal generating strip element be higher than that of a temperature-sensitive strip element chosen.

TABLE IV

Examples of harmonic generating sensor strip of embodiments of the present invention

| Alloy | Curie Temperature, $\theta_f(°$ C.) |
|---|---|
| $Fe_{80}B_{10}Si_{10}$ | 395 |
| $Fe_{78}Ni_2Mo_2B_{16}Si_2$ | 379 |
| $Fe_{75}Ni_4Mo_3B_{16}Si_2$ | 295 |
| $Co_{70.5}Fe_{4.5}B_{15}Si_{10}$ | 422 |
| $Co_{68.2}Fe_{3.8}Mn_1B_{12}Si_{15}$ | 266 |
| $Co_{67.8}Fe_{4.2}Mo_1B_{12}Si_{15}$ | 227 |
| $Co_{36}Ni_{35}Fe_8Mo_1B_{18}Si_2$ | 329 |
| $Co_{36}Ni_{35}Fe_8Mo_1B_{10}Si_{10}$ | 305 |
| $Ni_{35}Co_{35}Fe_{10}B_{18}Si_2$ | 285 |
| $Ni_{40}Co_{30}Fe_9Mo_1B_{18}Si_2$ | 280 |
| $Ni_{40}Co_{30}Fe_{10}B_{14.5}Si_2C_{3.5}$ | 269 |
| $Ni_{40}Co_{30}Fe_9Mo_1B_{14}Si_6$ | 240 |
| $Ni_{38}Co_{30}Fe_{10}Mo_2B_{14}Si_6$ | 215 |
| $Ni_{38}Co_{30}Fe_{10}Mo_2B_{15}Si_2C_3$ | 205 |
| $Ni_{40}Co_{30}Fe_9Mo_1B_8Si_{14}$ | 200 |
| $Ni_{38}Co_{30}Fe_{10}Mo_2B_{10}Si_{10}$ | 195 |
| $Ni_{40}Co_{30}Fe_8Mo_2B_{18}Si_2$ | 168 |
| $Ni_{38}Co_{30}Fe_{10}Mo_2B_6Si_{14}$ | 155 |

The Curie temperature of the amorphous alloys listed in Table IV varies from 155 to 422° C., allowing an alloy with a lower $\theta_f$ to be utilized as a temperature-sensitive strip element and allowing an alloy with a higher $\theta_f$ to be utilized as a harmonic generating strip element of embodiments of the present invention.

Figure 6:
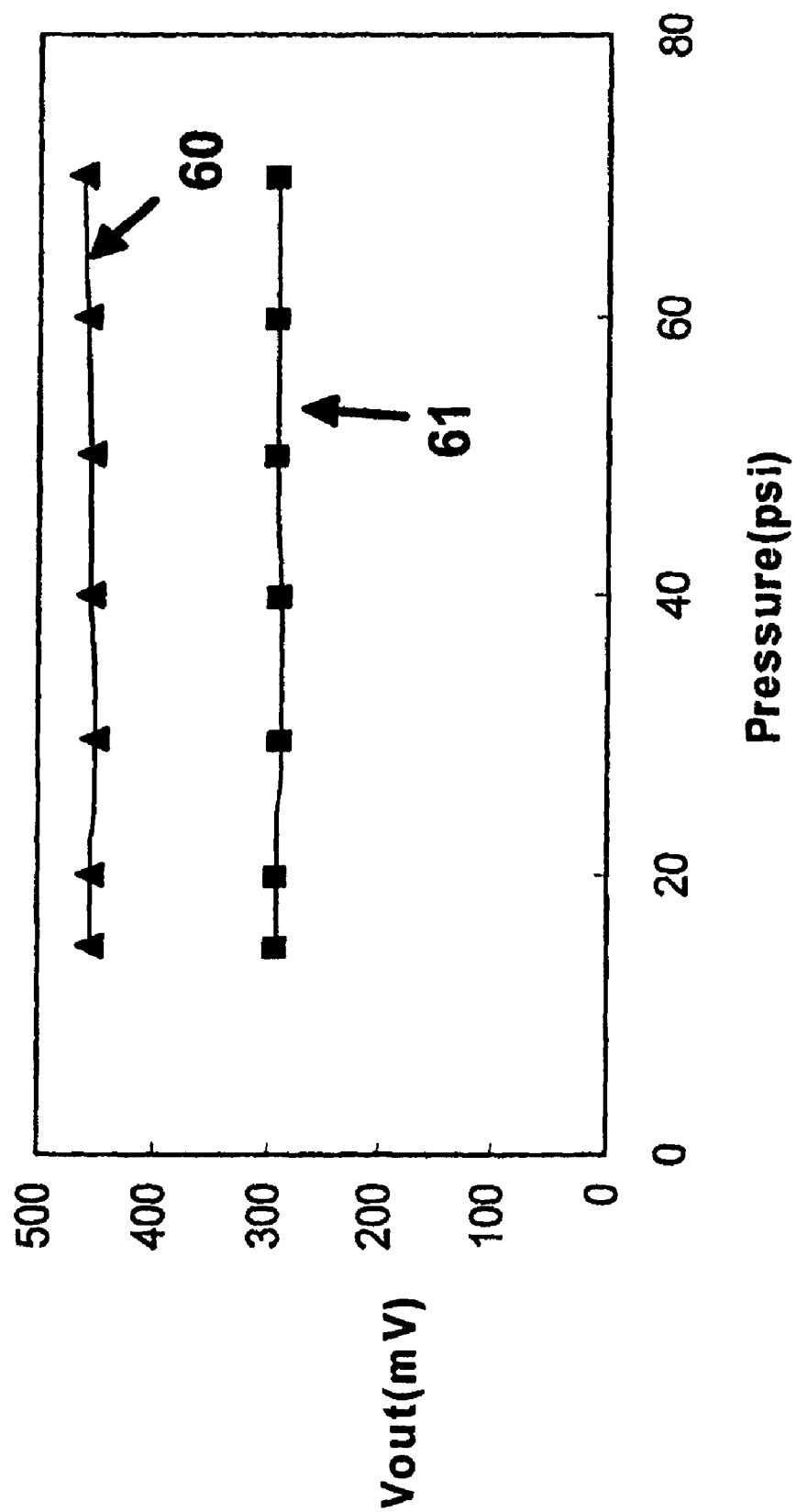
FIG. 6 is a graphical representation, depicting the pressure dependence of a three-strip sensor 2A of embodiments of the present invention of FIG. 2 in which the sensor strip elements 20 are based on METGLAS®2714A and the temperature sensing strip element 23 is cut from AM1, shown by Curve 60, and from AM2, shown by Curve 61.

The pressure dependence of the harmonic signal at room temperature from a three-strips temperature sensor in the sensor configuration 2A of FIG. 2 was measured by a method described in Example 4, and the results are shown in FIG. 6. For the two cases in FIG. 6, in the first case, the harmonic signal generating strip 20 was cut from METGLAS®2714A ribbon, and the temperature sensing strip 21 was cut from AM1 alloy ribbon of Table I, which is shown by Curve 60, and in the second case, the harmonic signal generating strip 20 was cut from METGLAS®2714A ribbon, and the temperature sensing strip 21 was cut from AM2 alloy ribbon of Table I, which is shown by Curve 61. The results indicate that the harmonic signals were independent of the pressure of an environment in which a tire temperature sensor of embodiments of the present invention was placeable.

Figure 7:
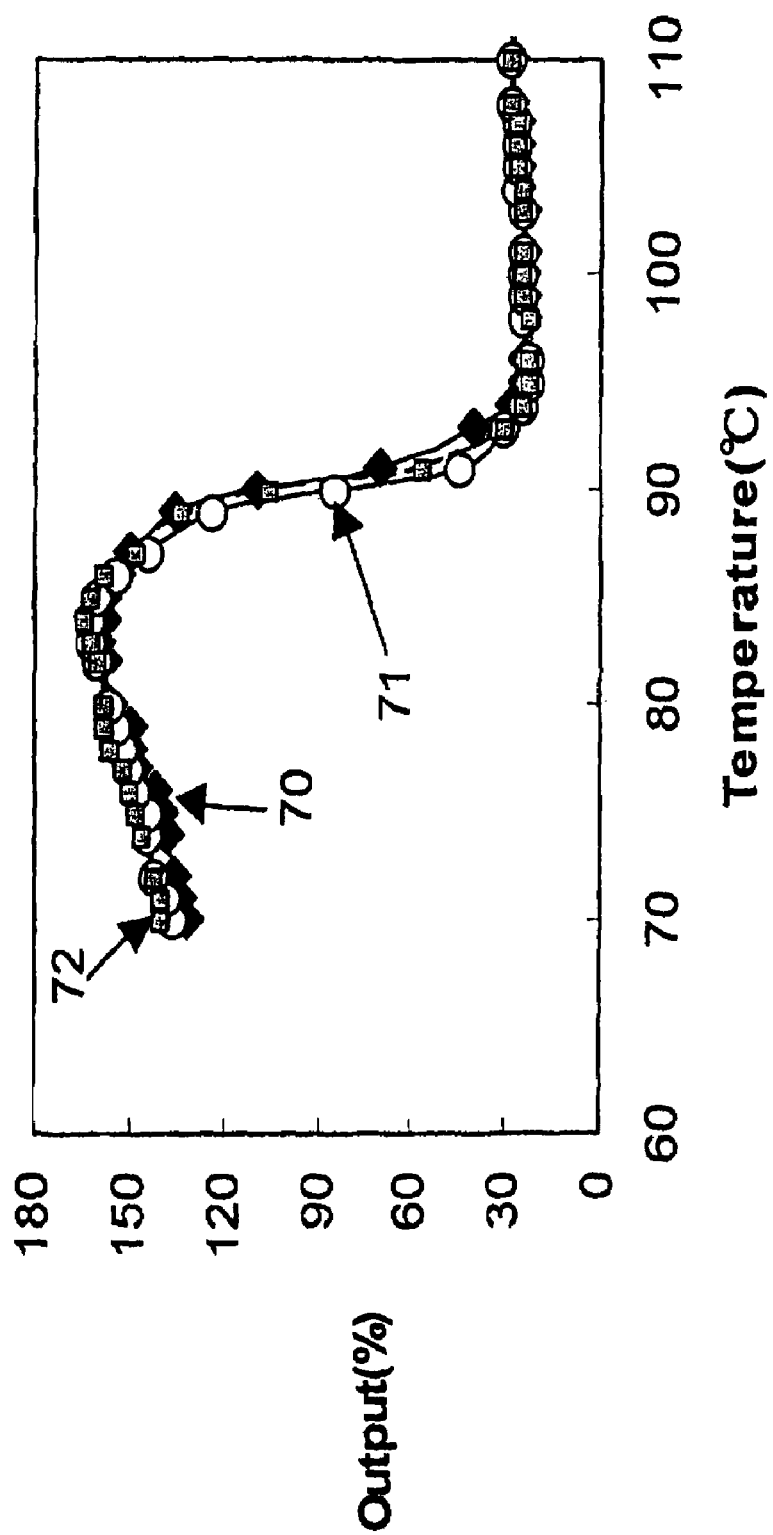
FIG. 7 is a graphical representation, depicting the temperature dependence of the three-strip sensor 2A of embodiments of the present invention of FIG. 2 in which the sensor strip elements 20 are based on METGLAS®2714A and the harmonic signal at 30 psi shown by Curve 70, at 40 psi shown by Curve 71 and at 50 psi shown by Curve 72.

The temperature dependence of the harmonic signal at the predetermined pressure which corresponds to the pressure of a pneumatic tire was measured by a method described in Example 5, and the results are shown in FIG. 7. For the three cases in FIG. 7, the harmonic signal was from three-strip temperature sensor in the sensor configuration 2A of FIG. 2, in which the harmonic signal generating strip 20 was cut from METGLAS®2714A ribbon and the temperature sensing strip 21 was cut from AM1 alloy ribbon of Table I. In FIG. 7 the harmonic signal at 30 psi is shown by Curve 70, the harmonic signal at 40 psi is shown by Curve 71, and the harmonic signal at 50 psi is shown by Curve 72. It is noted that a large reduction of the harmonic signal was observed near Curie temperature, $\theta_f=93°$ C. for AM1, of the temperature sensitive strip element corresponding to the element 21 of FIG. 2. Thus, independently of the pressure of a pneumatic tire, the temperature of a pneumatic tire was determined as the same as, or close to, the Curie temperature of the particular temperature sensitive strip chosen for this element in the sensor configuration 2A of FIG. 2.

Figure 8:
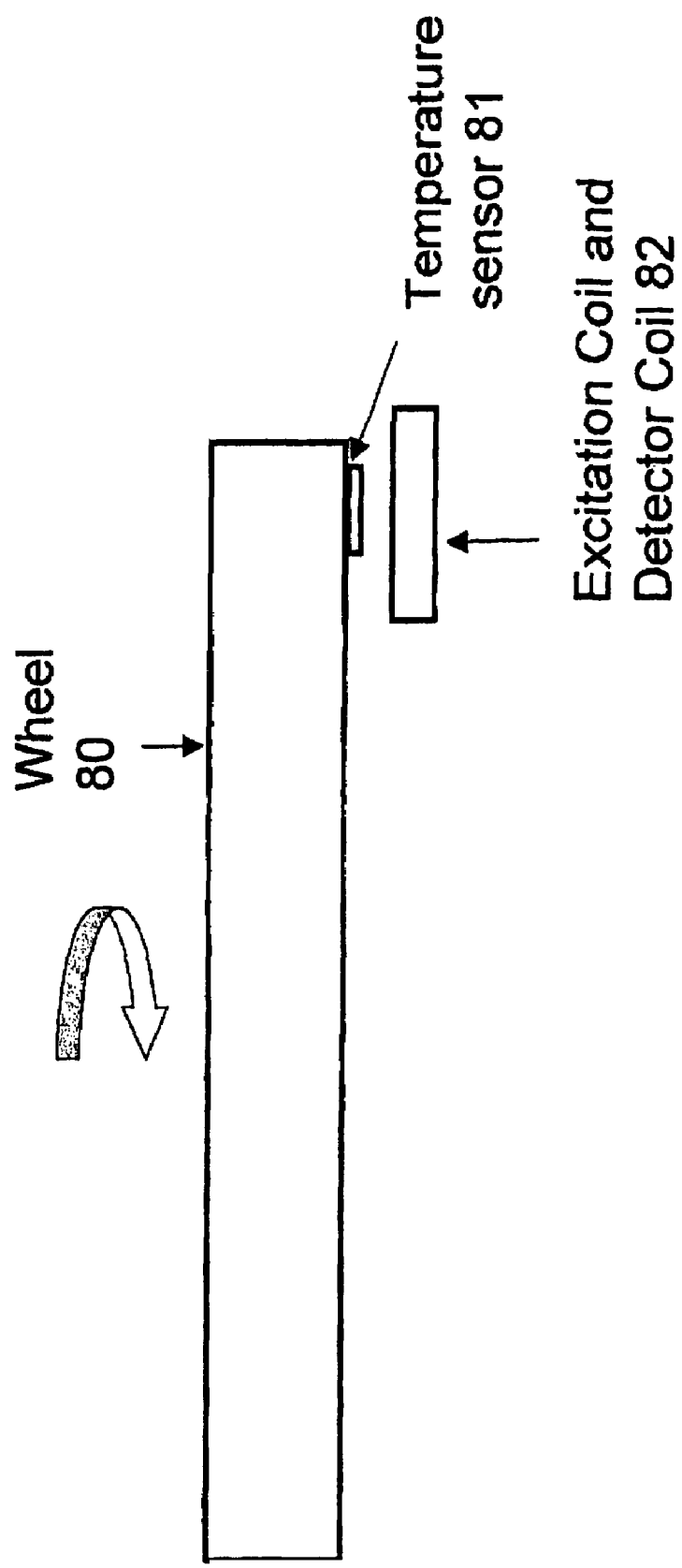
FIG. 8 is a schematic representation, illustrating a remote detecting device of an embodiment of the present invention having a rotating wheel 80, a temperature sensing strip sensor 81 and exciting and detecting coils 82.
Figure 9:
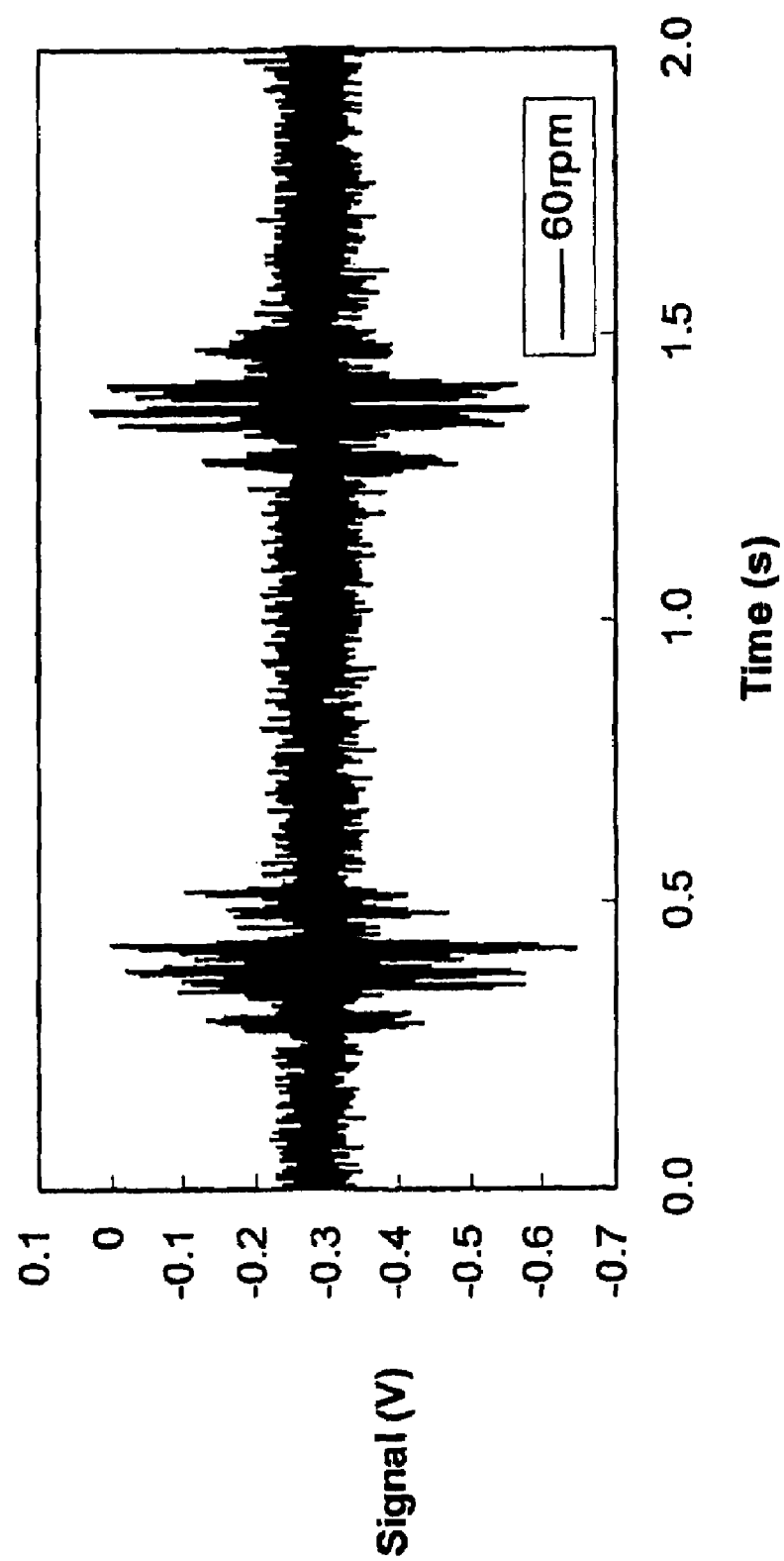
FIG. 9 is a signal diagram, depicting the detecting signal measured in the remote sensing device shown in FIG. 8. A three-strip sensor 2A of embodiments of the present invention of FIG. 2 is used, in which the sensor strip elements 20 are based on METGLAS®2714A and the temperature sensing strip element 23 is cut from AM1.

Referring to FIG. 8, a temperature sensor 81 in the sensor configuration 2A of FIG. 2 is placeable on a wheel 80. A magnetic field is provided by the excitation coil 82 and the generated harmonic signals from the temperature sensor 81 are monitored by a detector coil. The details are described in Example 6. While rotating the wheel, the signal was detected by detector coil 82 shown in FIG. 8. FIG. 9 depicts the detected signal when the wheel rotation speed was 60 rpm. This result indicates the harmonic signals are effectively detected when the temperature sensor passes by the exciting and detector coils. When the sensing element temperature is raised, the harmonic signal detected in the coil 82 varies with the environment temperature following the curves shown in FIGS. 5 and 7.

Figure 10:
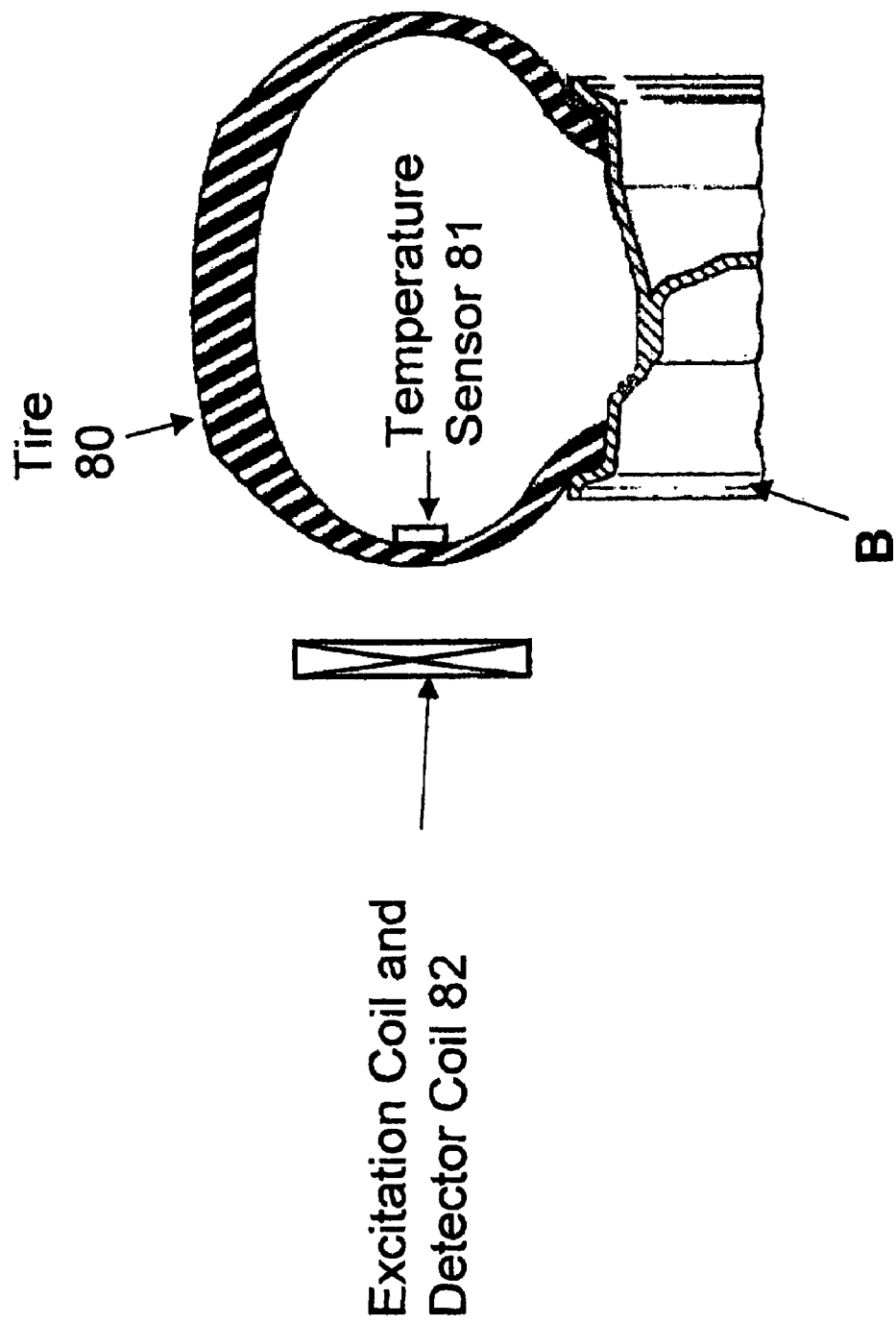
FIG. 10 is a schematic representation, illustrating a remote temperature sensing device according to an embodiment of the present invention for an automotive tire 80, comprising a temperature sensor 81 and a pair of excitation and detector coils 82. Tire 80 is attached to a tire rim B.
Figure 11:
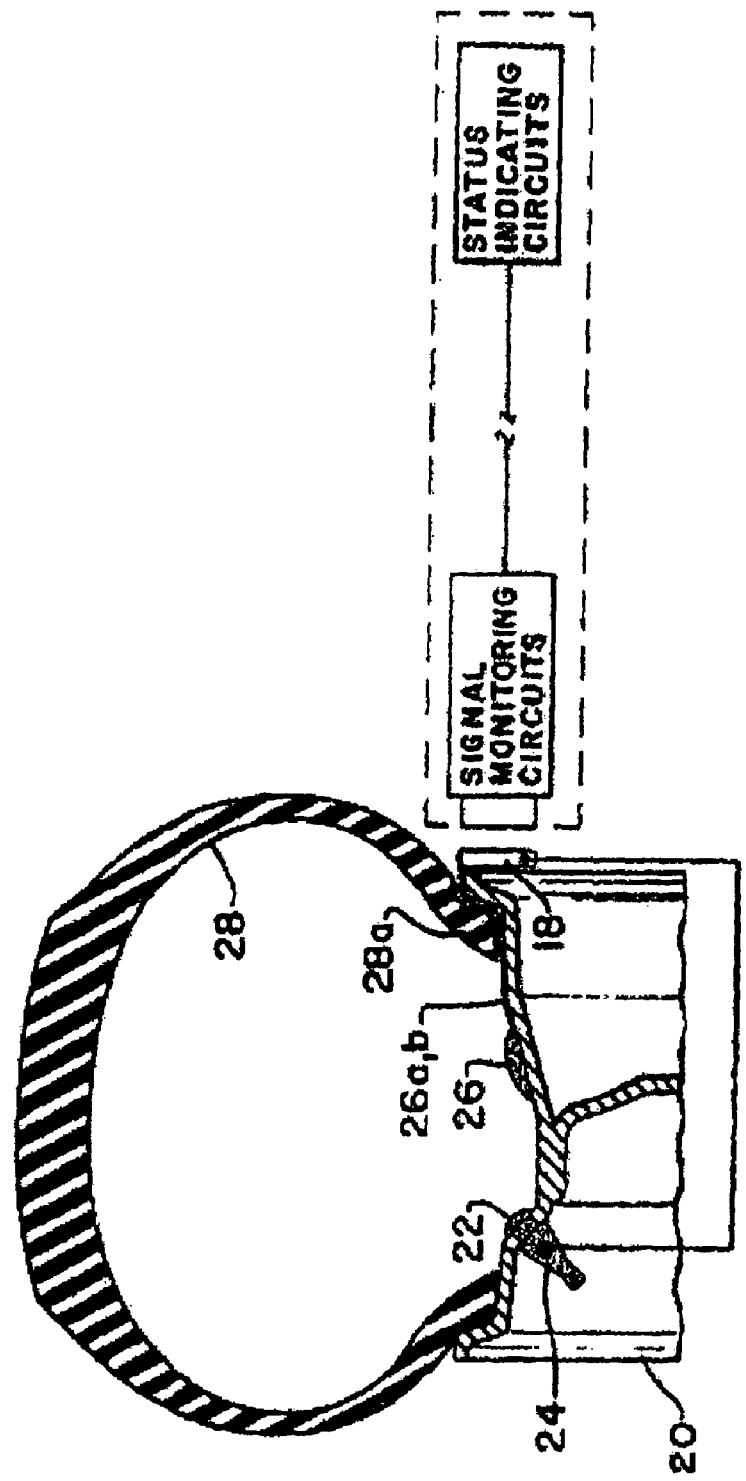
FIG. 11 is a schematic representation, illustrating a conventional temperature sensing monitor.

When the temperature sensitive element 21 or 23 in FIG. 2 becomes non-ferromagnetic as a result of an increase in the element's temperature above the Curie temperature, the harmonic signals are no longer detected in the excitation/detection coil 82. This change of the detecting signal is sent to the operator of the rotating machine, such as an automotive vehicle, as a warning signal or as a triggering signal for further machine operation. One such example is shown in FIG. 10, in which a temperature sensor 81 of embodiments of the present invention is attached inside an automotive tire 80 as shown. A pair of excitation and detector coils 82 are placeable outside tire 80, facing the temperature sensor 81. In FIG. 10, item B is a tire rim which holds tire 80. The advantage of this tire temperature sensing configuration using a temperature sensor of embodiments of the present invention becomes clear when it is compared with a prior art configuration of FIG. 11 taken from FIG. 1 of U.S. Pat. No. 4,052,696. In FIG. 11, a temperature sensing element 26 with a copper winding is attached to a tire rim 20 and is connected by wires indicated by 26a, 26b and 24 to a set of inductors 18 which inductively couple with signal monitoring circuits situated near inductive element 18. The temperature sensing element 26 has a ferrite core having a Curie magnetic transition temperature. When the temperature of the ferrite core reaches its Curie temperature, the inductance of the temperature sensing circuit changes, which is transmitted to the signal monitoring circuits. Since the magnetic permeability of ferrites is low, ranging from 80 to about 2000 in commercially available ferrites, as given in Table 22.2 on page 498 of "Physics of Magnetism" by S. Chikazumi (John Wiley & Sons, NY, 1964), the inductance change at a ferrites+ Curie temperature cannot be large. In addition, the Curie temperature of commercially available ferrites is limited to several temperatures. For example, $\theta_f(°$ C.)=110, 90, 130, 120 and 130 for Mn—Zn, Cu—Zn, Ni—Zn, Mg—Zn and Mg—Mn ferrite, respectively as given in Table 22.2 of Chikazumi's book. On the other hand, amorphous alloys used in embodiments of the present invention have permeabilities well above 2,000, and their Curie temperatures are varied continuously by changing the alloys' chemistries. Thus, a predetermined temperature of the temperature sensing element of embodiments of the present invention may be selected at any desirable temperature, and the change of the magnetic properties at the predetermined temperature is considerably higher than that from a ferrite material. The latter property advantage is reflected in the signal detected and shown in FIG. 9 in detector coil 82 of FIG. 8.

EXAMPLE 1

Sample Preparation

Amorphous magnetic alloys used in embodiments of the present invention were prepared by the metal casting method described in U.S. Pat. No. 4,142,571. The cast material was in ribbon form with a thickness around 20 µm and width ranging from about 25 mm to 213 mm.

A cast ribbon then was slit to a narrower ribbon with a width ranging from about 0.5 mm to 10 mm. If necessary, a slit ribbon was heat-treated to change its magnetic properties. A ribbon thus prepared was cut into pieces with variable lengths.

EXAMPLE 2

Commercially available dc BH loop measurement equipment was utilized to measure magnetic induction B as a function of applied field H. The results shown in FIG. 1 were obtained by using this equipment.

EXAMPLE 3

A temperature sensor strip element in accordance with Example 1 was placeable in an exciting AC field at a predetermined fundamental frequency, and its higher harmonics response was detected by a coil containing the strip element. The exciting coil and signal detecting coil were wound on a bobbin with a diameter of about 50 mm. The number of windings in the exciting coil and the signal detecting coil was about 180 and about 250, respectively. Inside the 50 mm-diameter bobbin, a non-magnetic tube was inserted in which a sample heating element was placed by which the strip sample temperature was varied. The temperature of the strip element was determined by attaching a thermocouple directly on one end of the strip element. The fundamental exciting AC field was chosen at 2.4 kHz, and its voltage at the exciting coil was about 80 mV. The $25^{th}$ harmonic voltages from the signal detecting coil were measured by a commercially available digital voltmeter.

EXAMPLE 4

A temperature sensor strip element with Example 1 was placeable in an exciting AC field at a predetermined fundamental frequency, and its higher harmonics response was detected by a coil containing the strip element. The exciting coil and signal detecting coil were wound on a non-magnetic tube with a diameter of about 50 mm. The number of windings in the exciting coil and the signal detecting coil was about 180 and about 250, respectively. Inside pressure of the tube was varied and determined by pressure gage. The fundamental exciting AC field was chosen at 2.4 kHz, and its voltage at the exciting coil was about 80 mV. The $25^{th}$ harmonic voltages from the signal detecting coil were measured by a commercially available digital voltmeter.

EXAMPLE 5

In an exciting AC field at a predetermined fundamental frequency, and its higher harmonics response was detected by a coil containing the strip element. The exciting coil and signal detecting coil were wound on a bobbin with a diameter of about 50 mm. The number of windings in the exciting coil and the signal detecting coil was about 180 and about 250, respectively. Inside the 50 mm-diameter bobbin, a non-magnetic tube was inserted in which a sample heating element was placed by which the strip sample temperature was varied. The inside pressure of the tube was varied and determined by a pressure gauge. The fundamental exciting AC field was chosen at 2.4 kHz, and its voltage at the exciting coil was about 80 mV. The $25^{th}$ harmonic voltages from the signal detecting coil were measured by a commercially available digital voltmeter.

EXAMPLE 6

A temperature sensor strip element in accordance with Example 1 was placeable on a wheel, and 8-figure exciting and detector coils were located at a 20 mm distance from the temperature sensor strip. The number of windings on the exciting and signal detecting coil was 40 and 320, respectively. The exciting coil was 15 cm×15 cm, and the detecting coil was 10 cm in diameter. The fundamental exciting field was chosen at 2.4 kHz, and its voltage was about 500 mV. The $13^{th}$ harmonics voltages from the signal detecting coil were measured by a commercially available oscilloscope. The wheel was rotated by a conventional variable speed motor.

Figure 12:
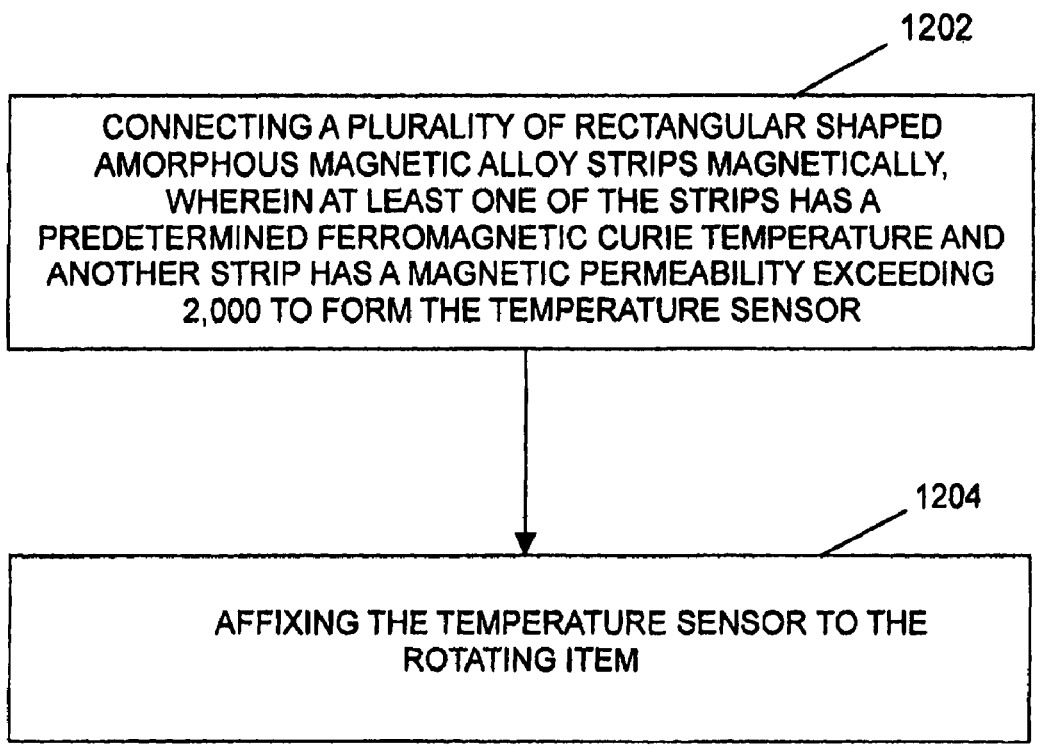
FIG. 12 is a flow diagram, illustrating operations of an embodiment of a method of remote temperature sensing for a rotating item in accordance with the present invention.

FIG. 12 illustrates operations of a method 1200 in accordance with an embodiment of the present invention. In one embodiment of the present invention there is provided a method 1200 of utilizing a remote temperature sensing device having a temperature sensor placeable on a rotating item, the method comprising connecting a plurality of rectangular shaped amorphous magnetic alloy strips magnetically 1202, wherein at least one of the strips has a predetermined ferromagnetic Curie temperature and another strip has a magnetic permeability exceeding 2,000 to form the temperature sensor; and affixing the temperature sensor to rotating item 1204.

In an embodiment of the present invention, the method further includes preparing the amorphous magnetic alloy strips with the predetermined ferromagnetic Curie temperature to have a composition defined essentially by the formula: $Fe_aM_bB_cSi_dC_e$, wherein 61<a<81, 0<b<15, 2≦c<25, 0<d<10 and 0<e≦18 and a+b+c+d+e=100, numbers being in atom percent, with the proviso that up to 50% of Fe content may be replaced by Ni, and M being selected from Cr, Mo, Nb, Ti, and W.

In another embodiment of the present invention, the method further includes preparing at least one amorphous magnetic alloy strip to have a magnetic permeability exceeding 2,000 and a composition defined essentially by the formula: $Fe_aNi_bCo_cM_eB_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+h=100, numbers being in atom percent.

In an embodiment of the present invention, the method further includes preparing the amorphous magnetic alloy strips, wherein one amorphous magnetic alloy strip with the predetermined ferromagnetic Curie temperature has a composition defined essentially by the formula: $Fe_aM_bB_cSi_dC_e$, wherein 61<a<81, 0<b<15, 2≦c<25, 0<d<10 and 0<e≦18 and a+b+c+d+e=100, numbers being in atom percent, with the proviso that up to 50% of Fe content may be replaced by Ni, and M being selected from Cr, Mo, Nb, Ti, and W; and wherein the another amorphous magnetic alloy strip has a magnetic permeability exceeding 2,000 and a composition defined essentially by the formula: $Fe_aNi_bCo_cM_eB_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+h=100, numbers being in atom percent.

In another embodiment of the present invention, the method further includes preparing, for the another strip of the sensing device, at least two amorphous magnetic alloy strips, wherein at least one strip has a magnetic permeability exceeding 2,000 and the two amorphous magnetic alloy strips have two different compositions defined essentially by the formula: $Fe_aNi_bCo_cM_eB_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+h=100, numbers being in atom percent.

In an embodiment of the present invention, the method further includes preparing the two amorphous magnetic alloy strips, wherein one amorphous magnetic alloy strip has the predetermined ferromagnetic Curie temperature and a composition defined essentially by the formula: $Fe_aM_bB_cSi_dC_e$, wherein 61<a<81, 0<b<15, 2≦c<25, 0<d<10 and 0<e≦18 and a+b+c+d+e=100, numbers being in atom percent, with the proviso that up to 50% of Fe content may be replaced by Ni, and M being selected from Cr, Mo, Nb, Ti, and W; and the another strip has a magnetic permeability exceeding 2,000 so that the amorphous magnetic alloy strips comprise a same chemical composition defined essentially by the formula: $Fe_aNi_bCo_cM_eB_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+h=100, numbers being in atom percent.

In another embodiment of the present invention, the method further includes preparing the at least one amorphous magnetic alloy strip having a magnetic permeability exceeding 2,000 and a composition defined essentially by the formula: $Fe_aNi_bCo_cM_eB_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+h=100, numbers being in atom percent; and preparing a plurality of amorphous magnetic alloy strips with different chemical compositions defined essentially by the formula: $Fe_{a1}M_bB_cSi_dC_e$, wherein 61<a<81, 0<b<15, 2≦c<25, 0<d<10 and 0<e≦18 and a+b+c+d+e=100, numbers being in atom percent, with the proviso that up to 50% of Fe content may be replaced by Ni, and M being selected from Cr, Mo, Nb, Ti, and W and defined essentially by the formula: $Fe_aNi_bCo_cM_eB_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e'f+h=100, numbers being in atom percent.

In an embodiment of the present invention, the method further includes interrogating the temperature sensor by a magnetic field and detecting said temperature sensor's response signal electromagnetically.

Interrogating the temperature sensor may include using at least one coil to emanate an interrogating magnetic field, and using at least another one coil of the remote sensing device to detect a magnetic response of said temperature sensor.

In an embodiment, the affixing the temperature sensor to the rotating item comprises affixing the temperature sensor to a vehicle tire.

Although a few embodiments and examples of the present invention have been shown and described, it would be appreciated by those skilled in the art that changes may be made in these embodiments without departing from the principles and spirit of the invention, the scope of which is defined in the claims and their equivalents.

What is claimed is:

1. A remote temperature sensing device having a temperature sensor placeable on a rotating item, comprising:
    the temperature sensor being a plurality of rectangular-shaped amorphous magnetic alloy strips connected magnetically, wherein at least one of the amorphous magnetic alloy strips has a predetermined ferromagnetic Curie temperature and another amorphous magnetic alloy strip has a magnetic permeability exceeding 2,000, and the temperature sensor is placeable on the rotating item, wherein said temperature sensor is interrogated by a magnetic field and said temperature sensor's response signal is detected electromagnetically.

2. The remote temperature sensing device of claim 1, wherein the amorphous magnetic alloy strips with the predetermined ferromagnetic Curie temperature have a composition defined essentially by the formula: $Fe_a$, $M_bB_cSi_dC_e$, wherein 61<a<81, 0<b<15, 2≦c≦25, 0<d<10 and 0<e≦18 and a+b+c+d+e=100, numbers being in atom percent, with the proviso that up to 50% of Fe content may be replaced by Ni, and M being selected from Cr, Mo, Nb, Ti, and W.

3. The remote temperature sensing device of claim 1, wherein the another amorphous magnetic alloy strip having a magnetic permeability exceeding 2,000 has a composition defined essentially by the formula: $Fe_aNi_bCo_cM_eB_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+g+h=100, numbers being in atom percent.

4. The remote temperature sensing device of claim 1, wherein the sensing device comprises:
    one amorphous magnetic alloy strip with the predetermined ferromagnetic Curie temperature and that has a composition defined essentially by the formula: $Fe_aM_b$-$B_cSi_dC_e$, wherein 61<a<81, 0<b<15, 2≦c≦25, 0<d<10 and 0<e≦18 and a+b+c+d+e=100, numbers being in atom percent, with the proviso that up to 50% of Fe content may be replaced by Ni, and M being selected from Cr, Mo, Nb, Ti, and W; and
    the another amorphous magnetic alloy strip having a magnetic permeability exceeding 2,000 has a composition defined essentially by the formula: $Fe_aNi_bCo_cM_e$, $B_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+g+h=100, numbers being in atom percent.

5. The remote temperature sensing device of claim 1, wherein the another strip of the sensing device comprises:
    two amorphous magnetic alloy strips having a magnetic permeability exceeding 2,000, the two amorphous magnetic alloy strips having two different compositions defined essentially by the formula: $Fe_aNi_bCo_cM_e,B_f$-$Si_gC_h$ wherein 3<a<80, 0<b<41, 0<c<72, 0<e<4, with M selected from Cr, Mo, and Mn, 1 <f<20, 0<g<16 and 0<h<4, and a+b+c+e+f+g+h=100, numbers being in atom percent.

6. The remote temperature sensing device of claim 1, wherein the sensing device comprises:
    one amorphous magnetic alloy strip with the predetermined ferromagnetic Curie temperature and that has a composition defined essentially by the formula: $Fe_aM_b$-$B_cSi_dC_e$, wherein 61<a<81, 0<b<15, 2<c≦25, 0<d<10 and 0<e≦18 and a+b+c+d+e=100, numbers being in atom percent, with the proviso that up to 50% of Fe content may be replaced by Ni, and M being selected from Cr, Mo, Nb, Ti, and W; and
    the another strip having a magnetic permeability exceeding 2,000 comprises two amorphous magnetic alloy strips with a same chemical composition defined essentially by the formula: $Fe_aNi_bCo_cM_e$, $B_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+g+h=100, numbers being in atom percent.

7. The remote temperature sensing device of claim 1, wherein the sensing device comprises:
    the at least one amorphous magnetic alloy strip having a magnetic permeability exceeding 2,000, having a composition defined essentially by the formula: $Fe_aNi_b$ $Co_c$-$M_eB_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+g+h=100, numbers being in atom percent; and
    a plurality of amorphous magnetic alloy strips with different chemical compositions defined essentially by the formula: $Fe_aM_bB_cSi_dC_e$, wherein 61<a<81, 0<b<15, 2≦c≦25, 0<d<10 and 0<e≦18 and a+b+c+d+e=100, numbers being in atom percent, with the proviso that up to 50% of Fe content may be replaced by Ni, and M being selected from Cr, Mo, Nb, Ti, and W and defined essentially by the formula: $Fe_aNi_bCo_cM_eB_fSi_gC_h$ wherein 3<a<80, 0<b<41, 0<c<72, 0<e<4, with M selected from Cr, Mo, and Mn, 1<f<20, 0<g<16 and 0<h<4, and a+b+c+e+f+g+h=100, numbers being in atom percent.

8. The remote temperature sensing device of claim 1, wherein the sensing device comprises at least one coil emanating an interrogating magnetic field and at least one coil detecting a magnetic response of said temperature sensor.

9. The remote temperature sensing device of claim 1, wherein the rotating item is a vehicle tire.

10. The remote temperature sensing device of claim 1, wherein said temperature sensor is interrogatable by an AC magnetic field.

11. The remote temperature sensing device of claim 1, wherein said temperature sensor is interrogated by an AC magnetic field.

12. A method of utilizing a remote temperature sensing device having a temperature sensor placeable on a rotating item, the method comprising:

connecting a plurality of rectangular-shaped amorphous magnetic alloy strips magnetically, wherein at least one of the amorphous magnetic alloy strips has a predetermined ferromagnetic Curie temperature and another amorphous magnetic alloy strip has a magnetic permeability exceeding 2,000 to form the temperature sensor;

affixing the temperature sensor to the rotating item; and interrogating the temperature sensor by a magnetic field and detecting said temperature sensor's response signal electromagnetically.

13. The method of claim 12, further comprising preparing the amorphous magnetic alloy strips with the predetermined ferromagnetic Curie temperature to have a composition defined essentially by the formula: $Fe_aM_bB_cSi_dC_e$, wherein $61<a<81$, $0<b<15$, $2\leq c<25$, $0<d<10$ and $0<e\leq 18$ and $a+b+c+d+e=100$, numbers being in atom percent, with the proviso that up to 50% of Fe content may be replaced by Ni, and M being selected from Cr, Mo, Nb, Ti, and W.

14. The method of claim 12, further comprising preparing at least one amorphous magnetic alloy strip to have a magnetic permeability exceeding 2,000 and a composition defined essentially by the formula: $Fe_aNi_bCo_cM_eB_fSi_gC_h$, wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

15. The method of claim 12, further comprising preparing the amorphous magnetic alloy strips, wherein one amorphous magnetic alloy strip with the predetermined ferromagnetic Curie temperature has a composition defined essentially by the formula: $Fe_aM_bB_cSi_dC_e$, wherein $61<a<81$, $0<b<15$, $2\leq c<25$, $0<d<10$ and $0<e\leq 18$ and $a+b+c+d+e=100$, numbers being in atom percent, with the proviso that up to 50% of Fe content may be replaced by Ni, and M being selected from Cr, Mo, Nb, Ti, and W; and wherein the another amorphous magnetic alloy strip has a magnetic permeability exceeding 2,000 and a composition defined essentially by the formula: $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

16. The method of claim 12, further comprising preparing the at least one of the strips having a predetermined ferromagnetic Curie temperature and the another strip of the sensing device by preparing at least two amorphous magnetic alloy strips, wherein the at least one strip has a magnetic permeability exceeding 2,000 and the at least one alloy strip and the another strip each have two different compositions defined essentially by the formula: $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

17. The method of claim 12, further comprising preparing the two amorphous magnetic alloy strips, wherein one amorphous magnetic alloy strip has the predetermined ferromagnetic Curie temperature and a composition defined essentially by the formula: $Fe_aM_bB_cSi_dC_e$, wherein $61<a<81$, $0<b<15$, $2\leq c<25$, $0<d<10$ and $0<e\leq 18$ and $a+b+c+d+e=100$, numbers being in atom percent, with the proviso that up to 50% of Fe content may be replaced by Ni, and M being selected from Cr, Mo, Nb, Ti, and W; and the another strip has a magnetic permeability exceeding 2,000 so that the amorphous magnetic alloy strips comprise a same chemical composition defined essentially by the formula: $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

18. The method of claim 12, further comprising:

preparing the at least one amorphous magnetic alloy strip having a magnetic permeability exceeding 2,000 and having a composition defined essentially by the formula: $Fe_aNi_bCo_cM_e B_fSi_gC_h$ wherein $3<a<80$, $0<b<41$, $0<c<72$, $0<e<4$, with M selected from Cr,Mo,and Mn, $1<f<20$, $0<g<16$ and $0<h<4$, and $a+b+c+e+f+g+h=100$, numbers being in atom percent; and preparing a plurality of amorphous magnetic alloy strips with different chemical compositions defined essentially by the formula: $Fe_aM_bB_cSi_dC_e$, wherein $61<a<81$, $0<b<15$, $2\leq c<25$, $0<d<10$ and $0<e\leq 18$ and $a+b+c+d+e=100$, numbers being in atom percent, with the proviso that up to 50% of Fe content may be replaced by Ni, and M being selected from Cr, Mo, Nb, Ti, and W and defined essentially by the formula: $Fe_aNi_bCo_cM_e B_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

19. The method of claim 12, wherein interrogating the temperature sensor comprises using at least one coil to emanate an interrogating magnetic field, and using at least one coil to detect a magnetic response of said temperature sensor.

20. The method of claim 12, wherein affixing the temperature sensor to the rotating item comprises affixing the temperature sensor to a vehicle tire.

21. The method of claim 12, further comprising interrogating the temperature sensor with an AC magnetic field.

22. The method of claim 12, wherein interrogating is carried out with an AC magnetic field.

* * * * *

UNITED STATES PATENT AND TRADEMARK OFFICE
CERTIFICATE OF CORRECTION

PATENT NO. : 7,985,022 B2
APPLICATION NO. : 11/712449
DATED : July 26, 2011
INVENTOR(S) : Daichi Azuma et al.

It is certified that error appears in the above-identified patent and that said Letters Patent is hereby corrected as shown below:

Column 13, Line 42, in claim 2, delete "$Fe_a, M_bB_cSi_dC_e,$" and insert -- $Fe_aM_bB_cSi_dC_e,$ --, therefor.

Column 13, Line 43, in claim 2, delete "$0<b <15,$" and insert -- $0<b<15,$ --, therefor.

Column 13, Line 66-67, in claim 4, delete "$Fe_aNi_bCo_cM_e, B_fSi_gC_h$" and insert -- $Fe_aNi_bCo_cM_eB_fSi_gC_h$ --, therefor.

Column 14, Line 9-10, in claim 5, delete "$Fe_aNi_bCo_cM_e,B_fSi_gC_h,$" and insert -- $Fe_aNi_bCo_cM_eB_fSi_gC_h$ --, therefor.

Column 14, Line 20, in claim 6, delete "$2<c\leqq25,$" and insert -- $2\leqq c<25,$ --, therefor.

Column 14, Line 28, in claim 6, delete "$Fe_aNi_bCo_cM_e, B_fSi_gC_h$" and insert -- $Fe_aNi_bCo_cM_eB_fSi_gC_h$ --, therefor.

Column 15, Line 50, in claim 16, delete "$Fe_aNi_bCo_cM_e,B_fSi_gC_h$" and insert -- $Fe_aNi_bCo_cM_eB_fSi_gC_h$ --, therefor.

Column 16, Line 15, in claim 17, delete "$Fe_aNi_bCo_cM_e B_fSi_gC_h$" and insert -- $Fe_aNi_bCo_cM_eB_fSi_gC_h$ --, therefor.

Column 16, Line 23, in claim 18, delete "$Fe_aNi_bCo_cM_e B_fSi_gC_h$" and insert -- $Fe_aNi_bCo_cM_eB_fSi_gC_h$ --, therefor.

Column 16, Line 23, in claim 18, delete "$0<b <41,$" and insert -- $0<b<41,$ --, therefor.

Column 16, Line 24, in claim 18, delete "Cr,Mo,and" and insert -- Cr, Mo, and --, therefor.

Column 16, Line 25, in claim 18, delete "$0<h<4,and$" and insert -- $0<h<4,$ and --, therefor.

Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 7,985,022 B2

Column 16, Line 30, in claim 18, delete "0<b <15," and insert -- 0<b<15, --, therefor.

Column 16, Line 34-35, in claim 18, delete "$Fe_aNi_bCo_cM_e\ B_fSi_gC_h$" and insert -- $Fe_aNi_bCo_cM_eB_fSi_gC_h$ --, therefor.

Column 16, Line 35, in claim 18, delete "0<b <41," and insert -- 0<b<41, --, therefor.